(12) United States Patent
Diachina et al.

(10) Patent No.: US 7,376,104 B2
(45) Date of Patent: May 20, 2008

(54) SEAMLESS RE-SELECTION METHOD FOR MOBILE DATA SERVICES

(75) Inventors: John Diachina, Garner, NC (US); Gunnar Rydnell, Ravlanda (SE)

(73) Assignee: Ericsson AB (SE)

( * ) Notice: Subject to any disclaimer, the term of this patent is extended or adjusted under 35 U.S.C. 154(b) by 925 days.

(21) Appl. No.: 10/696,316

(22) Filed: Oct. 29, 2003

(65) Prior Publication Data
US 2004/0136392 A1   Jul. 15, 2004

Related U.S. Application Data

(63) Continuation of application No. 09/378,820, filed on Aug. 23, 1999, now abandoned.

(51) Int. Cl.
*H04Q 7/00* (2006.01)
(52) U.S. Cl. ........................................ 370/332
(58) Field of Classification Search ............... None
See application file for complete search history.

(56) References Cited

U.S. PATENT DOCUMENTS

| | | | |
|---|---|---|---|
| 5,381,443 A | 1/1995 | Borth et al. | |
| 5,708,656 A | 1/1998 | Noneman et al. | |
| 5,768,267 A | 6/1998 | Raith et al. | |
| 5,930,721 A | 7/1999 | Fried et al. | |
| 5,940,371 A * | 8/1999 | Mitts et al. | 370/236 |
| 6,016,428 A | 1/2000 | Diachina et al. | |
| 6,018,661 A | 1/2000 | Raith et al. | |
| 6,091,717 A | 7/2000 | Honkasalo et al. | |
| 6,094,426 A | 7/2000 | Honkasalo et al. | |
| 6,295,450 B1 | 9/2001 | Lyer et al. | |
| 6,389,008 B1 | 5/2002 | Lupien et al. | |
| 6,463,055 B1 | 10/2002 | Lupien et al. | |
| 2001/0011019 A1 * | 8/2001 | Jokimies | 455/449 |

FOREIGN PATENT DOCUMENTS

| | | |
|---|---|---|
| CN | 2221820 | 3/1996 |
| EP | 0888026 A2 | 12/1998 |

* cited by examiner

Primary Examiner—Chau Nguyen
Assistant Examiner—Sori A Aga
(74) Attorney, Agent, or Firm—Coats & Bennett, P.L.L.C.

(57) ABSTRACT

A re-selection method reduces time needed to switch a packet data session from a first packet data channel in one cell to a second packet data channel in another cell. While the mobile station is engaged in a packet data session on the first packet data channel, it monitors the channel quality of control channels in adjacent cells. During the packet data session, the mobile stations reads at least part of the broadcast information on the adjacent control channels before the re-selection decision is made and identifies potential re-selection candidates. When certain predetermined criteria are met, one or more of the adjacent control channels are identified as potential re-selection candidates and the mobile station switches to a new packet data channel in the selected cell. Because the mobile station has previously read the broadcast information in the selected cell, it can immediately acquire service of the new packet data channel.

13 Claims, 3 Drawing Sheets

SEAMLESS RE-SELECTION METHOD FOR MOBILE DATA SERVICES

This is a continuation of U.S. patent application Ser. No. 09/378,820, filed Aug. 23, 1999 and is abandoned, the disclosure of which is incorporated herein by reference.

FIELD OF THE INVENTION

The present invention relates generally to mobile packet data services implemented in a mobile communication network and, more particularly, to a re-selection method for switching channels while engaged in packet data transfer.

BACKGROUND OF THE INVENTION

GSM and other cellular networks often provide data services that allow the sending and receiving of computer and facsimile data. For example, the General Packet Radio Service (GPRS) is a new GSM data service that provides packet-switched data transmission for GSM mobile radios. The General Packet Radio Service allows the mobile station to establish a data session with an Internet server providing packet data service. The mobile station accesses the fixed network (e.g., GPRS network) via a Packet Data Channel on the air interface. The connection over the Internet utilizes the TCP/IP protocol for end-to-end delivery.

While roaming, it may be necessary for the mobile station to switch channels to maintain a communications link or to ensure a minimum quality standard for the communication link. While a packet data session is in progress, the mobile station monitors the signal strength on the current control channel, as well as the signal strength on control channels in adjacent cells in order to determine which channel provides the strongest signal. When the signal strength in an adjacent control channel is stronger than the signal strength of the current control channel, the mobile station will switch to the adjacent cell. The process of switching from a channel in the current cell to a control channel in an adjacent cell is known as a re-selection.

In the case of a mobile station engaged in a packet data session on a Packet Data Channel, the re-selection is normally initiated by the mobile station. When the mobile station changes to the new channel, the GPRS network moves the TCP/IP connection to the base station controlling the new channel by the network and the packet data session will be continued without interruption. From the mobile user's point of view, the packet data session will appear uninterrupted. This is known as a seamless re-selection.

To facilitate the re-selection, the base station provides the mobile station a neighbor list containing control channels suggested in neighboring cells on which to perform power measurements. This neighbor list is transmitted by the base station in a neighbor cell list message broadcasted on the control channel for the current cell. While monitoring the control channels on the neighbor cell list, the mobile station must read the base station identification code (BSIC) which is transmitted on each of the neighboring control channels. This allows the mobile station to identify and confirm that the control channels monitored by the mobile station are the intended ones. When a control channel in one of the adjacent cells becomes stronger than the current control channel, the mobile station makes a decision to re-select to the stronger channel. The mobile station must then synchronize to the new channel and read the broadcast information before it is able to send or receive data on the new channel. Once the mobile station has synchronized to the new channel, the network can switch the connection to the base station serving the new channel and can start forwarding packet data to and from the mobile station.

At present, there have been some difficulties in implementing packet data services in mobile communication networks. For example, the TCP protocol flow control mechanism is not well suited to radio channel communication. During the re-selection process, while the mobile station is attempting to synchronize to the new channel and read information thereon, the TCP peers will not be able to send and receive payload and control information as required for optimal performance. TCP protocol timers may expire in the TCP flow algorithm, which may slow down the throughput and cause the TCP protocol to go into recovery mode. When the mobile station eventually completes the re-selection process, there may be some delay in re-establishing the flow of data and, therefore, the throughput will be degraded. In some cases, the TCP connection may be lost and the session closed. These problems will result in a perceivable degraded service for the end-user.

In the interest of enhancing the grade or quality of services provided to end-users, it is important to minimize the amount of time the mobile station spends performing a re-selection during a packet data session.

SUMMARY OF THE INVENTION

The present invention is a method used in a mobile communication network to negotiate a re-selection while the mobile station is engaged in a packet data session. The cellular communication network includes a plurality of cells, each served by a base station. Each base station has an associated control channel for broadcasting information needed by mobile stations to gain access to a traffic channel within that cell. The frame timing for base stations in different cells may be synchronized so that the transmission of TDMA frames, multi frames, and hyper frames are all synchronized.

During a data packet session, the mobile station is assigned a Packet Data Channel (PDCH) on which to send and receive data. While the packet data session is active, the mobile station continually monitors the quality and power level of the signal from the serving cell and from adjacent cells. These measurements are used by the mobile station to determine when to switch to a channel in another cell. This process is referred to as re-selection. Generally speaking, the mobile station will initiate a re-selection procedure when the signal strength of the control channel in a neighboring cell is greater than the signal strength of the control channel in the current cell.

At present, acquisition of service on the new channel is delayed because the mobile station needs to read the broadcast information on the control channel in the new cell in order to acquire service on the new Packet Data Channel. During re-selection, the mobile station synchronizes to the control channel in the new cell and reads the broadcast information. After reading the broadcast information on the control channel in the new cell, the mobile station can then switch to the new Packet Data Channel and resume data transmission.

The present invention avoids the delays inherent in reading broadcast information after synchronizing to the new control channel by allowing a mobile station to read broadcast information on adjacent channels in anticipation of a re-selection. While engaged in a packet data session, the mobile station reads broadcast information on adjacent control channels which are likely candidates for re-selection.

An adjacent control channel may be considered a potential re-selection candidate when it is present in a list of the N strongest neighbors, or when it meets some other criteria indicating that it will soon be chosen as the re-selection candidate. Since the mobile station reads the broadcast information in the background before the re-selection process is initiated, it is able to minimize the delay in resuming data transmission on the Packet Data Channel in the new cell. Background reading of broadcast information in adjacent channels is made possible because the frame timing of control channels is synchronized throughout the network.

Once the mobile station acquires service on the new Packet Data Channel, it transmits a signal indicating its presence on the new channel. When the network detects the mobile station's presence on the new channel, the network immediately switches its transmissions to the base station providing service to the new cell, which then forwards the data packets to and from the mobile station.

Compared to the prior art method of reading broadcast information after synchronizing to the new control channel, this re-selection method is faster and can result in a noticeable increase in service quality for the end-user.

DETAILED DESCRIPTION OF THE INVENTION

Figure 1:
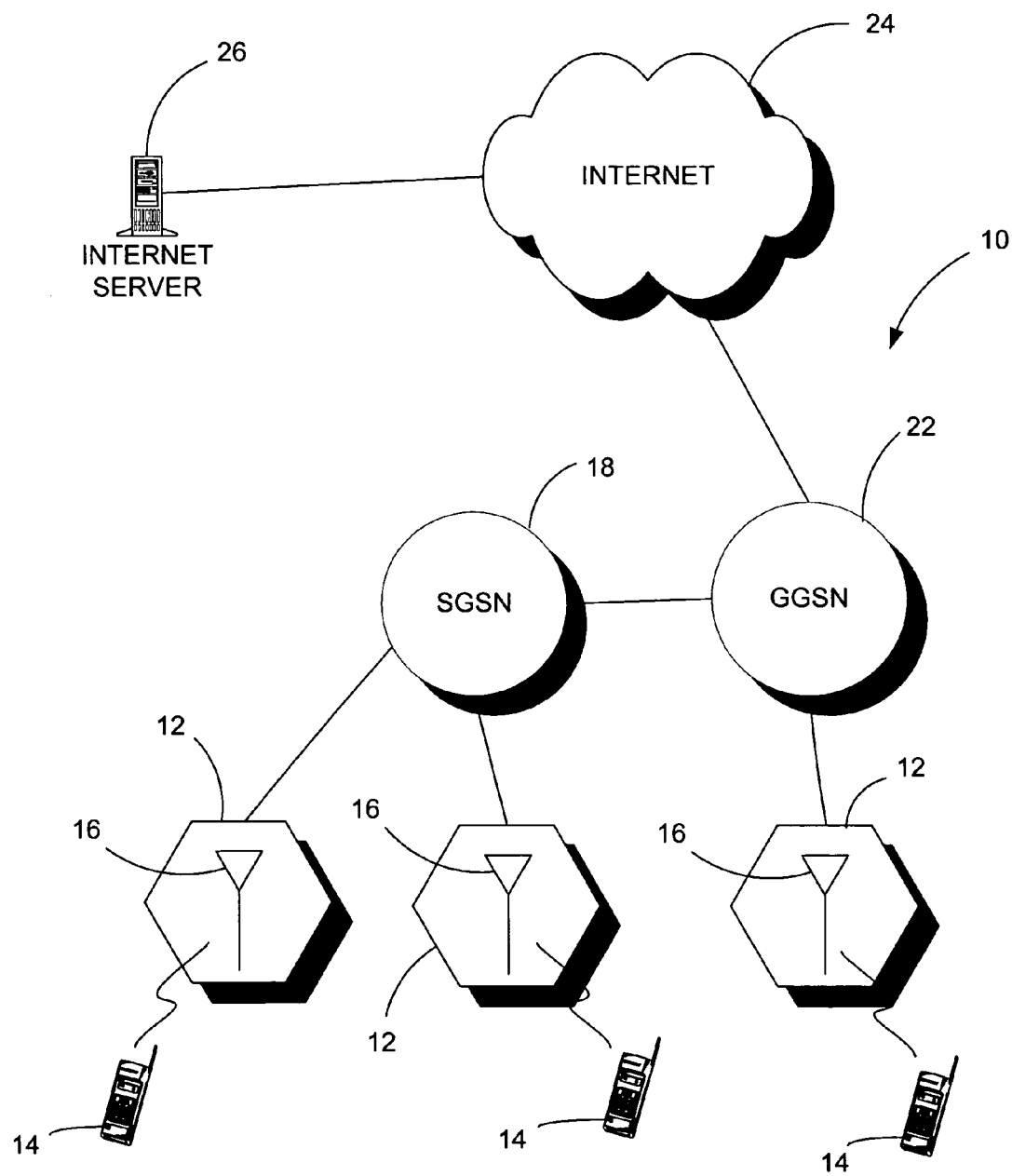
FIG. 1 is a schematic diagram of a cellular communication network.

FIG. 1 is a block diagram of a mobile communication network generally designated by the numeral 10. The mobile communication network 10 comprises a plurality of contiguous cells 12 that provide radio coverage throughout the network. Each cell 12 is served by a base station 16 that provides service to mobile phones 14 within that particular cell. The base stations 16 are connected to a Serving GPRS Support Node (SGSN) 18, which is connected via a Gateway GPRS Serving Node (GGSN) 22 to the Internet 24. The SGSN 18 routes data between the serving base station within the cellular communication network and the Internet. Thus, users of the cellular communication network 10 are able to communicate with Internet servers 26.

Mobile communications systems, such as GSM and D-AMPS, were originally designed primarily to provide voice services to mobile customers. Now, much more is expected. Customers want to be able to transmit and receive many kinds of data including facsimile data, e-mail and other forms of user data. To accommodate consumer demands, the GSM and D-AMPS standards have been modified to provide different types of data services. One service implemented by GSM is the General Packet Radio Service (GPRS). GPRS is a new GSM data service that provides packet-switched data transmission for GSM mobile radios. Typical applications for GPRS include internet browsing, wireless e-mail, train control system, and credit card processing. The GPRS system uses an enhanced GSM traffic channel to coordinate packet exchange. GPRS provides for peak data rates that can reach over 100 kbps, or even higher when data compression is used. The GPRS uses packet switching to transport data over the communication network. Packet switching arranges data into packets that are transmitted over the network. Each packet contains all of the information needed to route the data through the network without establishing a connection to the destination. The details of GPRS and packet switching is not necessary to understand the invention and is, therefore, omitted. However, those interested in such details may refer to the GSM Technical Specifications, Release 1998, which is incorporated herein by reference.

To implement GPRS, certain channels within each cell are designated as data channels. These channels are referred to as Packet Data Channels (PDCHs). The PDCHs are used by the mobile station 14 to transmit and receive data over the air interface. The base station serving the mobile terminal routes the data packets between the mobile station 14, and a Serving GSM Support Node (SGSN) 18. While the mobile station is engaged in a data session, it may travel from one cell to another. As the mobile station moves from one cell to a new cell, the data session must be transferred from the current base station to the base station serving the new cell. The process of transferring the data session from one base station to another is known as a re-selection.

Figure 2:
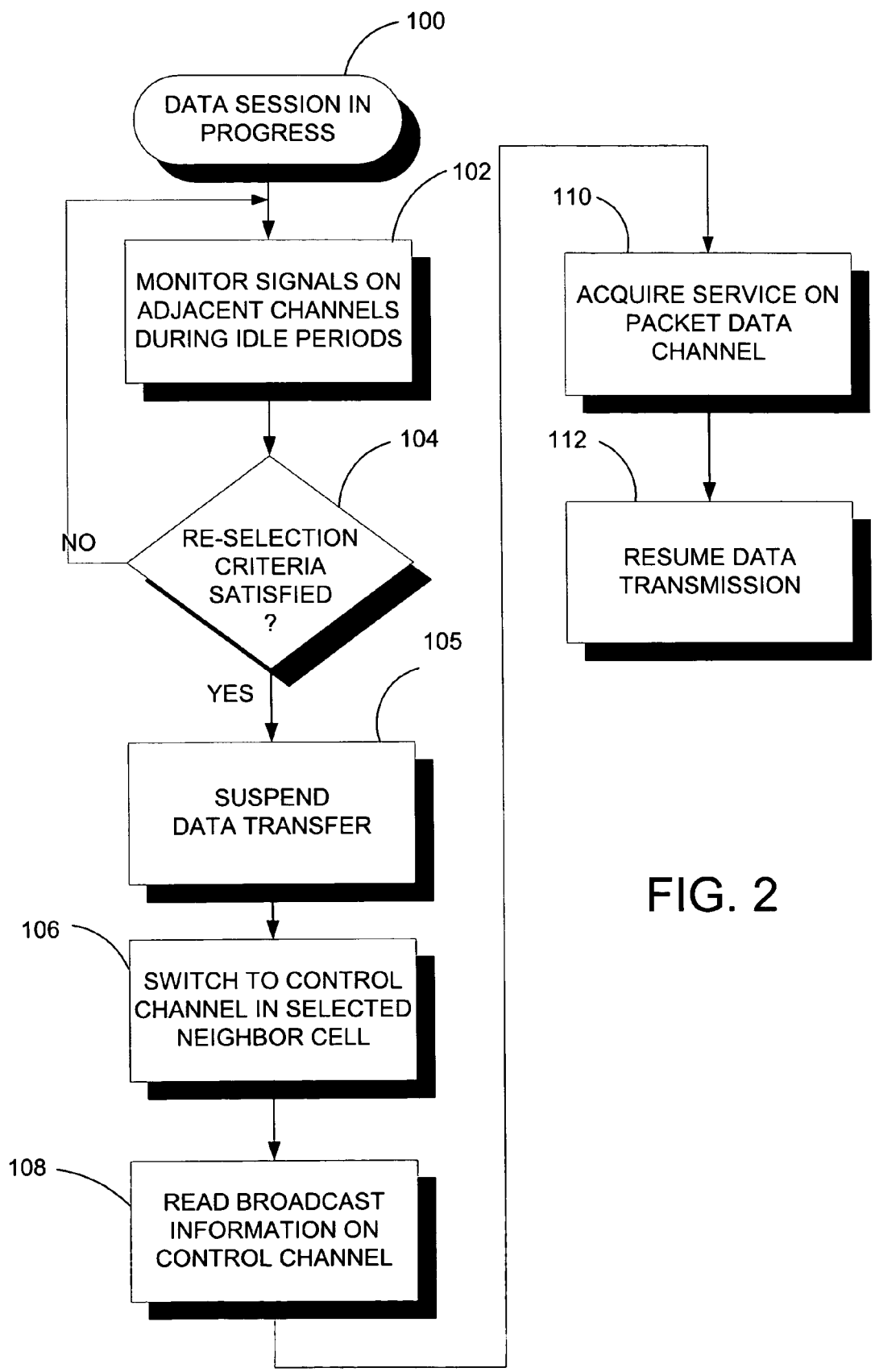
FIG. 2 is a flow diagram illustrating a prior art re-selection procedure.

FIG. 2 is a flow diagram illustrating the re-selection procedure currently being used in GSM to negotiate a re-selection during a packet data session. Block 100 shows the mobile station 14 already engaged in a packet data session on a radio packet data channel served by a SGSN. The mobile station 14 has already performed a successful GPRS attach procedure on the current PDCH. The mobile station 14 monitors the signal strength and quality of the signal in the adjacent control channels (block 102), as well as the signal received on the current control channel. The signal strength and quality measurements are used by the mobile station to determine when to switch channels; i.e., to initiate a re-selection procedure. This determination is based on re-selection criteria programmed into the mobile station 14. Generally speaking, a re-selection is triggered when the received signal strength in an adjacent control channel is stronger than the received signal strength in the current control channel. The re-selection criteria can also be based on quality measurements, such as bit error rates (BER). The particular re-selection criteria used is not material to the invention and any known re-selection criteria can be used.

At block 104, the mobile station 14 determines whether the re-selection criteria has been satisfied. If not, the mobile station 14 continues monitoring the adjacent channels during idle periods. When the re-selection criteria is satisfied, the mobile station 14 suspends data transmissions (block 105), switches to the control channel in the newly selected cell, and synchronizes its frame timing with the frame timing of the base station serving that cell (block 106). After synchronizing to the control channel in the new cell, the mobile station reads broadcast information on the control channel (block 108). The broadcast information includes information needed by the mobile station 14 to access the PDCH for that cell. The broadcast information may, for example, include the system identification information; the channel-specific access and other protocol parameters; the neighbor list for that cell; the serving cell's list of coincidental DCCH pointers; and routing area identity (RAC plus LAI).

After reading the broadcast information, the mobile station 14 acquires service on the new packet data channel (block 110) and resumes data transfer (block 112). When transmission is resumed, the mobile station 14 transmits an up-link LLC (logical link control) frame of any type containing the mobile station's identity. The base station relays the LLC frame to the SGSN using the BSSGP protocol. The base station adds the identifier of the cell to BSSGP protocol PDUs (protocol data units) transmitted toward the SGSN. The SGSN notices the cell update as the BSSGP header contains the cell identifier of the new base station servicing the mobile station 14. From the SGSN perspective, the cell update consists of any correctly received and valid LLC PDU carried inside a BSSGP PDU. The SGSN records the mobile station's new location and directs traffic to the new base station (cell) servicing the mobile station 14. When acknowledged mode is used, the SGSN is also responsible for buffering and re-transmitting LLC frames.

The amount of time it takes to acquire service on the new PDCH will depend on the amount of broadcast information on the new control channel. Typically, the broadcast information will comprise 8 multi-frames. Each multi-frame is 240 milliseconds. Therefore, when the broadcast information cycle is 8 multi-frames, it takes approximately 2 seconds to read a full cycle of broadcast information. This delay can result in degradation of service to the end-user and, in a worst case scenario, can result in the data session being lost.

Figure 3:
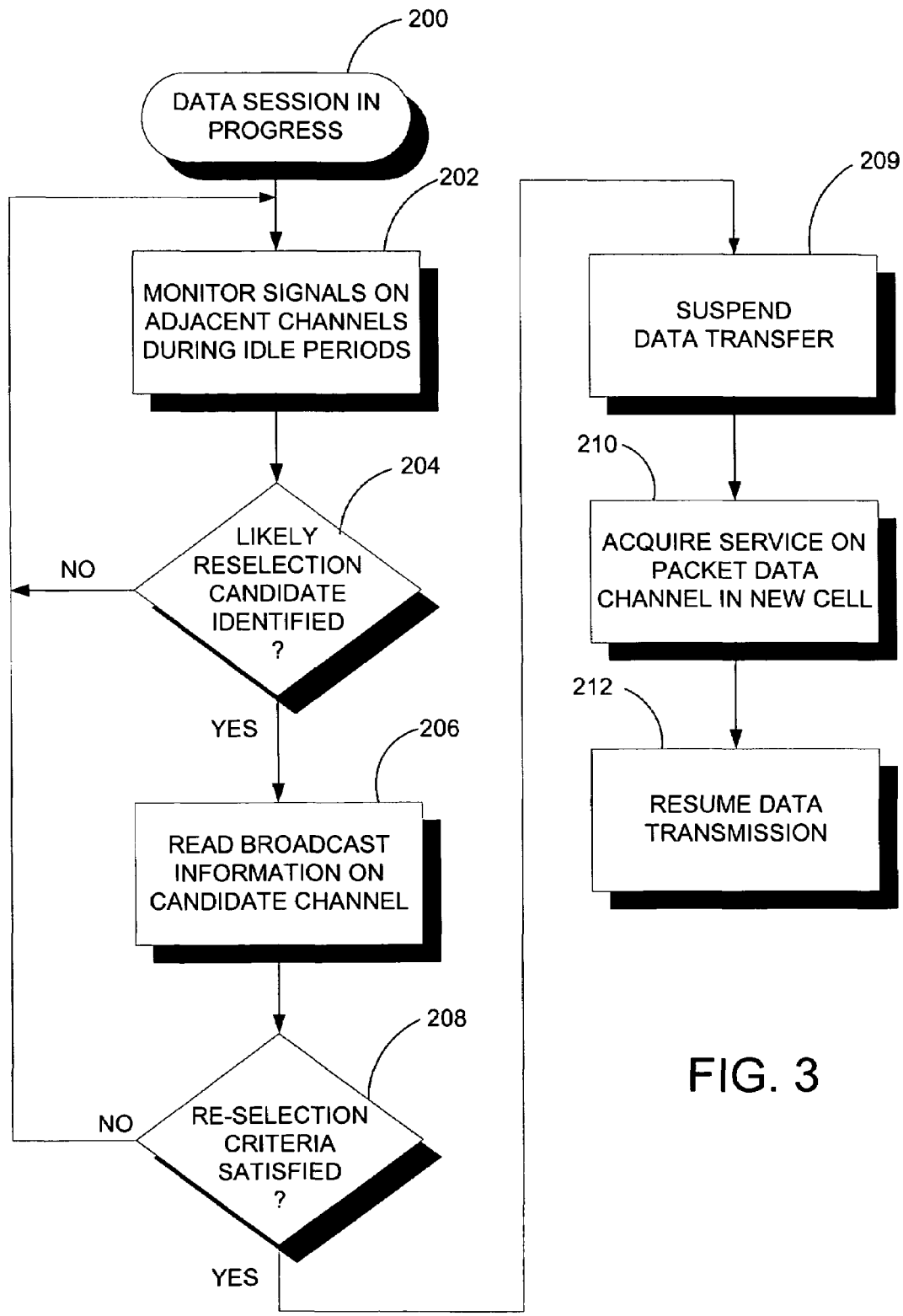
FIG. 3 is a flow diagram illustrating the re-selection procedure of the present invention.

FIG. 3 is a flow diagram illustrating a new re-selection procedure that reduces the amount of time needed to acquire service on the new PDCH. The essential feature of the new re-selection procedure is that the mobile station 14 is able to read broadcast information on the adjacent control channels in anticipation of a re-selection. In other words, the mobile station reads the broadcast information on adjacent control channels which are deemed likely candidates for re-selection before re-selection decision is made. Therefore, when the re-selection process is initiated, the mobile station 14 is able to immediately acquire service on the PDCH in the new cell without having to read the broadcast information thereon.

Referring now to FIG. 3, block 200 shows the mobile station 14 actively engaged in a data session. It has already performed a successful GPRS attach procedure to acquire service on the PDCH in the current cell. During idle periods, the mobile station 14 monitors the signal strength and/or quality of adjacent control channels, as well as the control channel in the current cell (block 202). The measurements taken by the mobile station 14 are used to determine when to initiate re-selection as previously described. However, before the re-selection is triggered, the mobile station identifies adjacent control channels that are likely candidates for re-selection (block 204). When an adjacent control channel is identified as a potential re-selection candidate, the mobile station 14 reads the broadcast information for each candidate channel (block 206). A neighbor may be considered as a potential re-selection candidate when it is present in the list of N strongest neighbors, or when it meets a narrower signal strength criteria indicating that it will soon be selected as the re-selection candidate. Those skilled in the art will recognize that other criteria can also be used to identify potential re-selection candidates, and that the particular criteria used is not a material aspect of the invention.

When the re-selection criteria is satisfied (block 208), the mobile station suspends data transfer (block 209) and then switches to and synchronizes with the Radio Packet Data Channel in the new cell (block 210). After acquiring service on the new PDCH, the mobile station immediately resumes data transmission (block 212). When data transmission resumes, the mobile station 14 transmits an up-link LLC frame containing the mobile station's identity. The base station adds the base station identifier to all higher level protocol frames it transmits toward the SGSN using the BSSGP (Base Station System GPRS Protocol) protocol layer. When the SGSN detects the cell update, it re-directs traffic toward the new base station serving the mobile station 14. One advantage of the invention is that it does not require any modification to the procedures used by the SGSN to respond to a cell update.

To implement the re-selection procedure shown in FIG. 3, it is necessary to provide a mechanism that allows the mobile station 14 to synchronize with the control channels in the neighboring cells. One way to enable synchronization with adjacent control channels is to synchronize the frame timing for all base stations within the network or within a defined area of the network encompassing the neighboring cells. If the frame timing in neighboring cells is synchronized with the frame timing in the current cell, the mobile station will be able to determine when the adjacent control channels are transmitting broadcast information. Several developments in recent years will also help the mobile stations read broadcast information in adjacent channel cells. For example, new GSM standards currently being developed employ a concept known as time groups. In networks employing time groups, the control channels associated with any given channel frequency are divided into time groups in order to support a required frequency re-use planning. According to the time group concept, a given control channel transmits broadcast information on its assigned time group but must not transmit anything during a time group allocated to adjacent control channels using the same frequency. Since the broadcast information on adjacent control channels using the same frequency are time-spaced, the mobile station 14 will be able to identify and read the broadcast information without interference. Also, in the newly proposed compact system, the last burst of a multi-frame contains a packet synchronization block (PSCH). During the PSCH block, the mobile station 14 can synchronize to any adjacent control channel. This means that the mobile station 14 can read the broadcast blocks in an adjacent control channel while it is in the idle or active mode on the current channel and before re-selecting to the adjacent control channel.

The primary advantage of the present invention is that it allows the mobile station to read all, or at least the essential part, of the broadcast information on adjacent control channels before the re-selection decision is made. When the re-selection decision is made, the mobile station 14 can immediately switch to the PDCH in the new cell, acquire synchronization, and resume data transmission. Compared to the prior art method, this re-selection method is faster and can result in a noticeable increase in service quality for the end-user.

In some cellular communication networks, information that is broadcast on the control channel in the neighbor cells is also included in a neighbor list that is transmitted to the mobile station on its current control channel. In this type of network, the mobile station would already have the necessary information to acquire service on the new control channel without having to read the broadcast information from that control channel. However, broadcasting information in the neighbor list is expensive in terms of bandwidth. If, instead, the present invention were used to allow the mobile station to read broadcast information from neighbors, then such information would not need to be sent in the neighbor list for all neighbors. In this case, the present invention would not necessarily speed up the re-selection process. However, the present invention would free up bandwidth that could be used for data traffic since duplicate information would not be broadcasted. Thus, the cellular operator would benefit even if the end-user would not directly experience improved service.

It is claimed that:

1. A re-selection method for switching a packet data session from a first packet data channel in one cell of a cellular communication network to a second packet data channel in another cell comprising:

beginning a packet data session on a packet data channel in a first cell of said network;

during said packet data session, monitoring the channel quality of adjacent control channels in adjacent cells to identify one or more adjacent cells as potential re-selection candidates;

during said packet data session and prior to determining that a cell re-selection procedure is required, reading broadcast information on a control channel identified as a potential re-selection candidate to prospectively obtain two or more parameters required to establish a new packet data channel for that cell, the two or more parameters being selected from the group consisting of system identification information, channel-specific access parameters, protocol parameters, neighbor list for that cell, the corresponding serving cell's coincidental DCCH pointers, and routing area identity;

when a predetermined re-selection criteria is met, selecting a new cell from the potential re-selection candidates, and establishing a new packet data channel using the two or more parameters prospectively obtained from the control channel corresponding to the new cell; and resuming the packet data session on said new packet data channel.

2. The re-selection method of claim 1 wherein the re-selection criteria is based upon a signal quality measure.

3. The re-selection method of claim 2 wherein the signal quality measure is a measure of received signal strength on the control channel.

4. The re-selection method of claim 3 wherein an adjacent control channel is identified as a re-selection candidate based upon the received signal strength of the control channel.

5. The re-selection method of claim 4 wherein an adjacent control channel is identified as a re-selection candidate when it is one of the n strongest control channels that are being monitored.

6. The re-selection method of claim 4 wherein an adjacent control channel is identified as a re-selection candidate when the received signal strength reaches a predetermined threshold.

7. A re-selection method comprising:

beginning a communication session on a traffic channel in a first cell;

during said communication session and prior to determining that a cell re-selection procedure is required, reading broadcast information on adjacent control channels in one or more adjacent cells that are identified as potential re-selection candidates to prospectively obtain one or more non-system identification information parameters required to establish a new traffic channel in each of the adjacent cells;

when a predetermined re-selection criteria is met, selecting a new cell from the potential re-selection candidates, and establishing a new traffic channel using the one or more parameters prospectively obtained from the control channel corresponding to the new cell; and resuming the packet data session on said new traffic channel.

8. The re-selection method of claim 7 wherein the re-selection criteria is based upon a signal quality measure.

9. The re-selection method of claim 8 wherein the signal quality measure is a measure of received signal strength on the control channel.

10. The re-selection method of claim 9 wherein an adjacent control channel is identified as a re-selection candidate based upon the received signal strength of the control channel.

11. The re-selection method of claim 10 wherein an adjacent control channel is identified as a re-selection candidate when it is one of the n strongest control channels that are being monitored.

12. The re-selection method of claim 10 wherein an adjacent control channel is identified as a re-selection candidate when the received signal strength reaches a predetermined threshold.

13. The re-selection method of claim 7 wherein said reading comprises reading, from said control channel identified as a re-selection candidate, at least one of the items selected from the group consisting of channel-specific access parameters, protocol parameters, neighbor list for that cell, the corresponding serving cell's coincidental DCCH pointers, and routing area identity.

* * * * *